(12) United States Patent
Greenbank

(10) Patent No.: US 7,770,960 B2
(45) Date of Patent: Aug. 10, 2010

(54) BIAXIAL DOOR HINGE

(76) Inventor: Dan Greenbank, 8680 Miralani Dr., Suite 102, San Diego, CA (US) 92126

( * ) Notice: Subject to any disclaimer, the term of this patent is extended or adjusted under 35 U.S.C. 154(b) by 107 days.

(21) Appl. No.: 12/262,102

(22) Filed: Oct. 30, 2008

(65) Prior Publication Data

US 2009/0106941 A1 Apr. 30, 2009

Related U.S. Application Data

(60) Provisional application No. 60/983,923, filed on Oct. 30, 2007.

(51) Int. Cl.
*B60J 5/00* (2006.01)
(52) U.S. Cl. .............................. 296/146.12; 296/146.11
(58) Field of Classification Search ............ 296/146.12, 296/146.11; 16/366, 334, 287
See application file for complete search history.

(56) References Cited

U.S. PATENT DOCUMENTS

| | | | |
|---|---|---|---|
| 3,589,069 A | 6/1971 | Lecomte | |
| 3,693,997 A * | 9/1972 | Dreyer | ........................ 280/775 |
| 6,086,137 A | 7/2000 | Leschke et al. | |
| 6,676,193 B1 | 1/2004 | Hanagan | |
| 6,808,223 B1 * | 10/2004 | Baum et al. | ............. 296/146.12 |
| 6,820,918 B1 * | 11/2004 | DeBono | ................ 296/146.11 |
| 6,845,547 B2 | 1/2005 | Ham | |
| 7,048,322 B2 * | 5/2006 | DeBono | ................ 296/146.11 |
| 7,059,655 B2 | 6/2006 | Ham | |
| 7,100,245 B2 * | 9/2006 | Wohlfarth | ..................... 16/367 |
| 7,140,075 B2 | 11/2006 | Ham | |
| 7,162,775 B2 | 1/2007 | Hoffman | |
| 7,210,200 B2 * | 5/2007 | Hoffman | ..................... 16/367 |
| 7,347,483 B2 | 5/2008 | DeBono | |
| 2004/0256882 A1 | 12/2004 | McRobert | |
| 2006/0123592 A1 * | 6/2006 | Yip | ............................ 16/241 |
| 2006/0200947 A1 | 9/2006 | Ham | |
| 2007/0138823 A1 | 6/2007 | Hoffman | |
| 2007/0245525 A1 | 10/2007 | Hoffman | |
| 2007/0283535 A1 | 12/2007 | Hoffman | |
| 2008/0083089 A1 | 4/2008 | Hoffman | |
| 2008/0083090 A1 | 4/2008 | Hoffman | |

FOREIGN PATENT DOCUMENTS

| | | |
|---|---|---|
| DE | 4012891 | 10/1991 |
| EP | 767082 | 4/1997 |
| EP | 1467051 | 10/2004 |
| WO | WO2004048138 | 6/2004 |

* cited by examiner

*Primary Examiner*—Kiran B. Patel
(74) *Attorney, Agent, or Firm*—Marc E. Hankin; Kevin Schraven; Hankin Patent Law, APC

(57) ABSTRACT

Various embodiments of this invention disclose a biaxial rear door hinge of a vehicle that allows the vehicle door to open outward and then upward. This biaxial hinge system allows the rear door in a sedan to mimic the look of a vertically pivoting front door.

13 Claims, 7 Drawing Sheets

BIAXIAL DOOR HINGE

CROSS-REFERENCE TO RELATED APPLICATIONS

Priority is claimed to U.S. Provisional Patent Application Ser. No. 60/983,923, filed on Oct. 30, 2007, and titled "Biaxial Door Hinge." This priority application is incorporated by reference herein as though set forth herein in full.

BACKGROUND OF THE INVENTION

This invention generally relates to hinge devices. Specifically, it pertains to a rear door hinge of a vehicle that allows the door to open outward and then upward.

Vehicle door hinges are typically heavy-duty utilitarian hinges that allow the vehicle driver and any passengers to enter or exit the vehicle in a routine manner. Vehicle doors are usually attached to the vehicle at the front edge of the vehicle door, and they swing outward from vehicle. In this manner the front edge of the vehicle door remains in close proximity to the vehicle and the back edge of the vehicle door moves away from the vehicle until it is open wide enough for the driver and passengers to enter or exit the vehicle. This type of hinge is called a standard front swing hinge. Unfortunately, a vehicle that has standard front swing hinges is very plain and the doors open just like every other vehicle does, that is, routine and generic. Additionally, the front edge of the door remains directly in the path of a driver or passenger who is entering or exiting the vehicle. Thus, the door acts as a continuing hindrance to the drivers and passengers as they enter or exit the vehicle.

When a vehicle door opens and swings both outward, towards the front of the vehicle, and then upward, towards the sky, this door looks very dramatic, as compared to a standard front swinging door. Furthermore, if the door swings upward, the front edge of the door does not remain in the way of a driver or passenger who is entering or exiting the vehicle. This type of vehicle door hinge that allows the door to first open outward and then upward is called a biaxial door hinge.

When a vehicle owner wishes to modify the doors of a vehicle so that the doors open in an outward and then upward manner, there are several commercial options available for modifying the front doors of the vehicle. However, if the vehicle is a four (or more) door sedan, there are no options available to modify the rear doors to closely resemble the look of the front doors when the vehicle is equipped with vertically opening front doors. Moreover, most production model vehicles come equipped only with standard front swing doors, and to install after market custom built hinges is very expensive. There is a need in the art for an inexpensive, easy to install, and off-the-shelf available vehicle rear door hinge that allows a vehicle rear door to be opened outward and then upward.

In the area of after market vehicle rear door hinges, there are no inexpensive, easy to install, and off-the-shelf available vehicle door hinge that allows a vehicle rear door to be opened outward and then upward.

Thus, there remains a long felt need in the art for an inexpensive, easy to install, and off-the-shelf available vehicle door hinge that allows a vehicle rear door to be opened outward and then upward.

BRIEF SUMMARY OF THE INVENTION

To minimize the limitations in the prior art, and to minimize other limitations that will become apparent upon reading and understanding the present specification, the present invention discloses a vehicle rear door hinge that opens outward and then upward.

One embodiment of this invention is a vehicle door hinge, comprising: a base plate; a door reinforcement plate; an one or more first axis base plates; one or more first axis pivot plates; one or more first axis pivots; a second axis pivot; a central axis pivot plate; a motion limiting device; a horizontal stop carrier; a horizontal stop adjuster; a lift support; and a lift support reinforcement plate. The base plate has a second axis pivot holder, a second axis stop support, and a motion limiting guide. The central axis pivot plate has a second axis pivot hole, one or more incremental top stops, a top stop reinforcement, a bottom stop reinforcement, and a horizontal stop reinforcement. The vehicle door hinge is attached to at least one rear door of a vehicle. The motion limiting device also has a motion limiting adjuster and the second axis stop support has a top stop adjuster and a bottom stop adjuster. The central axis pivot plate has a lift support mount that attaches to the lift support reinforcement plate and the lift support mount so that additional support is provided for opening and closing the vehicle door. The second axis pivot allows the vehicle door to open vertically at least until a side of said vehicle door is perpendicular to a ground. The first axis pivots allow the vehicle door to open horizontally wider than a standard vehicle door hinge allows and at least 60 degrees. The motion limiting device, when slotted into the motion limiting guide, prevents a vertical movement of the vehicle door hinge. The motion limiting adjuster allows a user to adjust how horizontally wide the vehicle door hinge must open before a vertical movement can be performed.

An object of the present invention is to provide a vehicle door that will overcome the deficiencies of the prior art.

Another object of the present invention is to provide a biaxial vehicle door hinge that allows a vehicle door to open outward and then upward so that the front edge of the door is not in the way of a passenger who is entering or exiting the vehicle.

Another object of the present invention is to provide a vehicle door hinge that allows a vehicle door to open in a greater horizontal range than a standard vehicle door hinge.

Another object of the present invention is to provide a vehicle door that is safe and easy to use, and allows for safe and easy entrance and exit from the vehicle.

Another object of the present invention is to provide a durable vehicle door hinge that may be used by a wide variety of people regardless of their body size or strength.

Another object of the present invention is to provide an inexpensive, easy to install, and off-the-shelf biaxial vehicle door hinge that can be installed on the rear door of a vehicle.

Other features and advantages are inherent in the vehicle door hinge claimed and disclosed will become apparent to those skilled in the art from the following detailed description and its accompanying drawings.

DETAILED DESCRIPTIONS OF THE DRAWINGS

In the following detailed description of the preferred embodiment, reference is made to the accompanying drawings that form a part hereof, and in which is shown, by way of illustration, a specific embodiment in which the invention may be practiced. It is to be understood that other embodiments may be utilized and structural changes may be made without departing from the scope of the present invention.

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

In the following description, certain terminology is used to describe certain features of one or more embodiments of the invention. For instance "lift support" refers to any device that can aid a person in moving a vehicle door in an upward or vertical direction. A "lift support" is preferably a cylindrical gas spring, known in the art of vehicle doors, but it can be a mechanical spring, a pump, a motorized linear actuator, hydraulic cylinder, an air cylinder, or a pneumatic pump, or be of any shape without deviating from the scope of the invention. An "adjuster" refers to any adjustment device, such as a pin or screw, that once adjusted remain in place until physically readjusted. A "B-Pillar" refers to the shaft of material that separates the front doors from the rear doors of a vehicle. Preferably a B-pillar is also a roll over reinforced beam. Finally, a B-pillar is typically the lathing and rear sealing surface for the front door, as well as an original equipment manufacturer hinge mounting and front sealing surface for the rear door. The B-pillar completes the major structure of the vehicle chassis to afford rigidity and side impact protection in addition to roll over protection.

Figure 1:
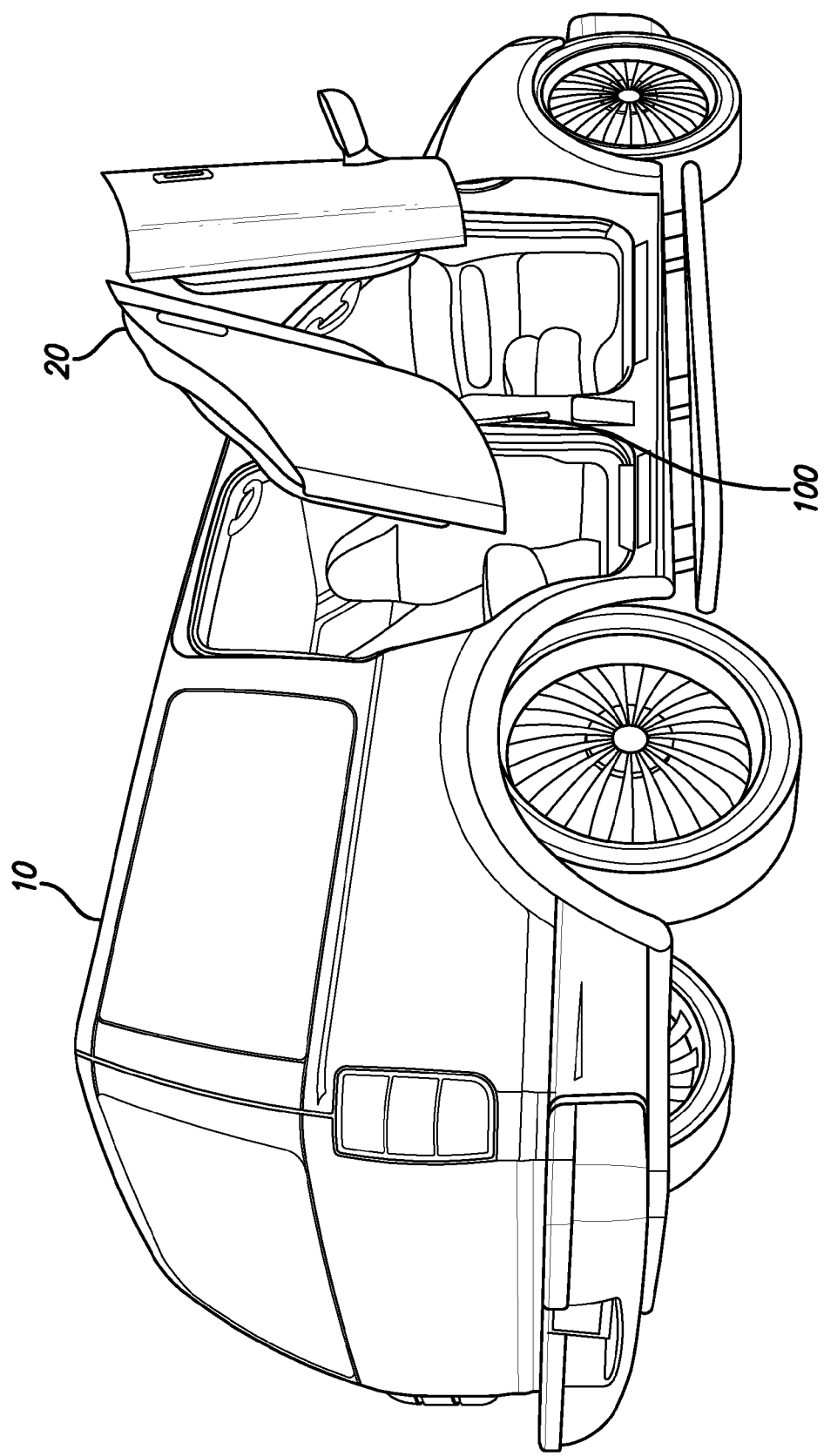
FIG. 1 is an illustration of a side and back perspective view of a vehicle with one embodiment of the vehicle hinge.

FIG. 1 is an illustration of a side and back perspective view of a vehicle with one embodiment of the vehicle hinge. FIG. 1 shows vehicle 10 with a biaxial hinge of the present invention installed in rear door 20. FIG. 1 shows one possible position that a rear door may be placed in if the biaxial hinge of the present invention is installed. FIG. 1 also shows lift support 100. Typically, when a vehicle owner modifies the rear door hinges, the front door hinges are also modified, as seen in FIG. 1. The biaxial hinge of the present invention, as shown in FIG. 1, is added to the center pillar of the vehicle frame (known as the "B-Pillar"). The compact, co-planar design of the biaxial hinge of the present invention allows this hinge to be used on the rear doors of a sedan, or any vehicle with more than two (2) doors. FIG. 1 also shows how the vertical motion of the biaxial hinge of the present invention is preferably used when the vehicles front doors are already open and in a resting position.

Figure 2:
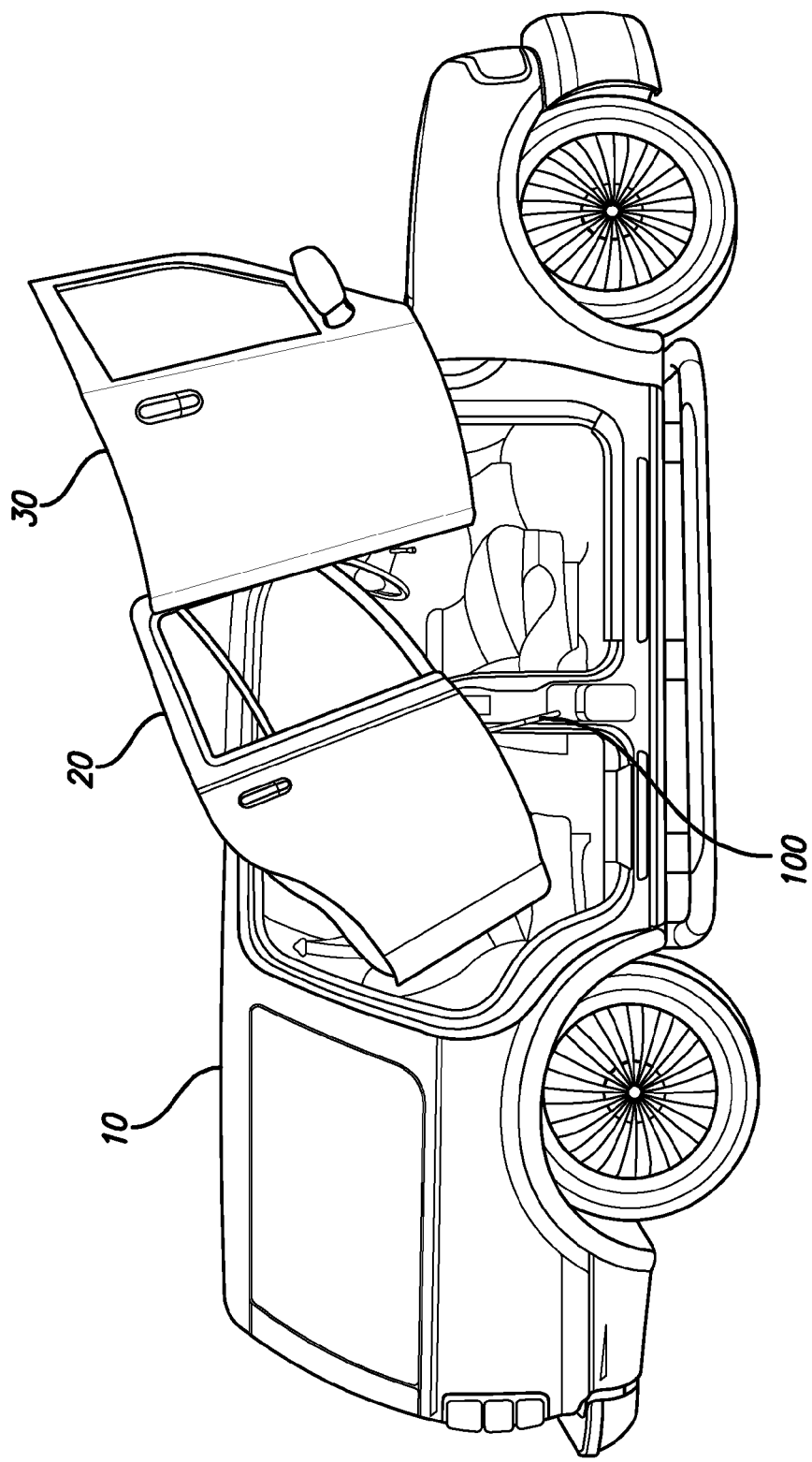
FIG. 2 is an illustration of a side view of a vehicle with one embodiment of the vehicle hinge.

FIG. 2 is an illustration of a side view of a vehicle with one embodiment of the vehicle hinge. FIG. 2 shows another angle of vehicle 10 with the biaxial hinge of the present invention installed on rear door 20. Rear door 20 is pushed horizontally away from vehicle 10, and then vertically upward until the front side of rear door 20 is almost perpendicular to the ground. The biaxial hinge of the present invention allows the user to set rear door 20 any open position. Further, rear door 20 may be pushed vertically upward until it is perpendicular (or even further) to the ground. Preferably front door 30 is already open before rear door 20 is opened vertically, but rear door 20 may open horizontally with the front door in any position.

Finally, FIG. 2 shows how lift support 100 attaches to the B-Pillar and rear door 20.

Figure 3:
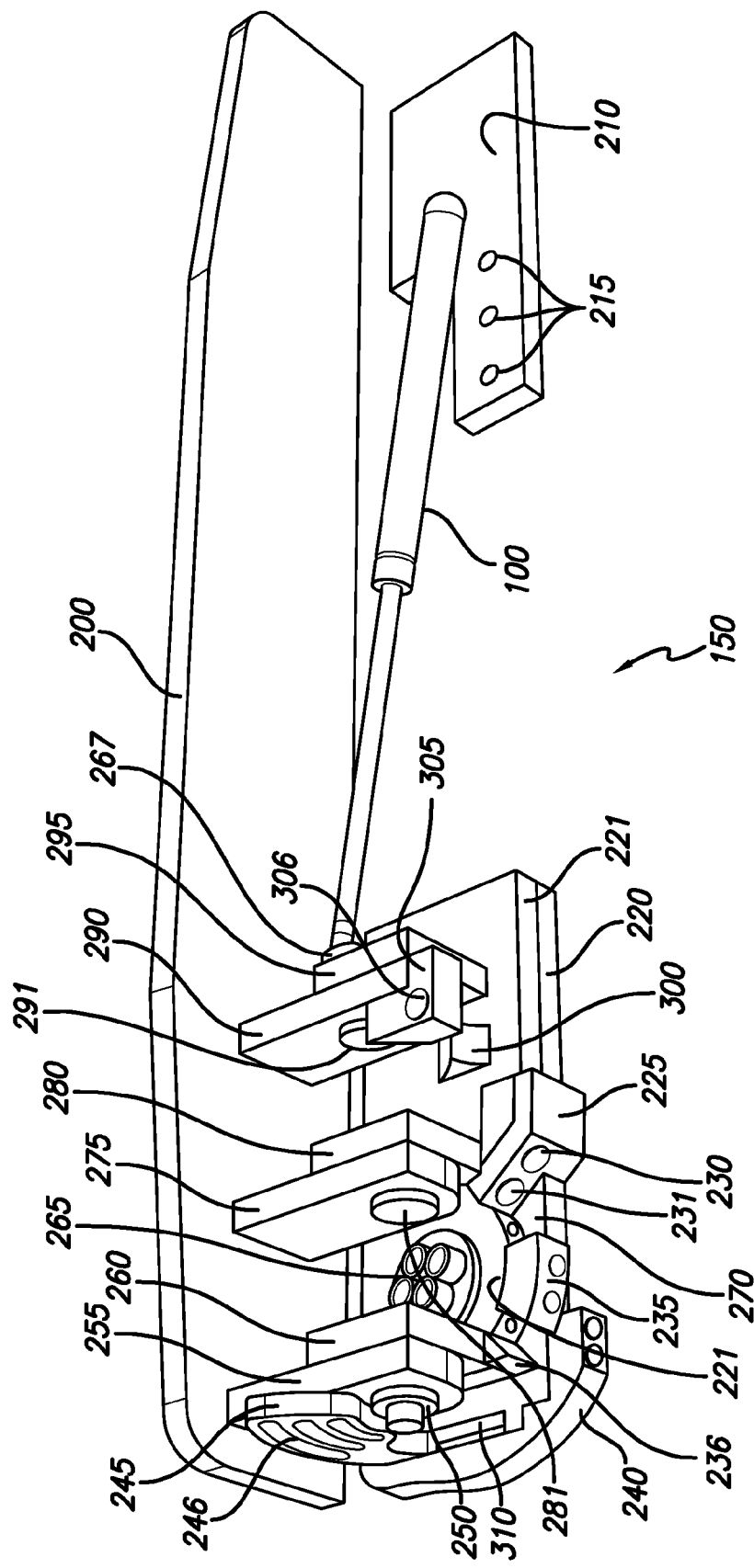
FIG. 3 is an illustration of a perspective view of one embodiment of the vehicle hinge.

FIG. 3 is an illustration of a perspective view of one embodiment of the vehicle hinge. As shown in FIG. 3, biaxial vehicle hinge 150 preferably includes door reinforcement plate 200, lift support reinforcement plate 210, adjustable mounting holes 215, base plate 220, central pivot plate 221, second axis stop support 225 (also called top and bottom stop support), bottom stop adjuster 230, top stop adjuster 231, incremental top stops 235, top stop reinforcement 236, motion limiting guide 310, motion limiting guide reinforcement 240, motion limiting device 245, motion limiting adjuster 246, first axis pivots 250, 281, and 291, first axis pivot plates 255, 275, and 290, first axis base plates 260, 280, and 295, second axis pivot 265, lift support mount 267, base plate 270, horizontal stop reinforcement 300, horizontal stop carrier 305, and horizontal stop adjuster 306. The base plate 220 and lift support plate 210 are preferably connected to the B-pillar of a vehicle door frame, and door reinforcement plate 200 is preferably connected to the front edge of the rear door of a vehicle. Although the parts of biaxial hinge 150 are preferably made of metal alloy, they can be made from any natural or synthetic material, including, but not limited to: metal; metal alloy; wood or other fibrous plant products; glass; composite materials such as graphite, fiberglass, boron, or Kevlar; admixtures of plastic resins combined with metal, metal alloy, wood or other fibrous plant products, glass, or composite materials; plastic; animal materials; or any combination of these materials, without departing from the scope of the present invention.

FIG. 3 shows the approximate position of where lift support 100 would engage lift support mount 267 and lift support reinforcement plate 210. Depending on how much support is needed and what type of lift support is used, lift support 100 can be adjusted to fit into any of several adjustable mounting holes 215.

Preferably, door plate 200 connects to the vertically rotating central pivot plate 221 through three first axis pivot plates 255, 275, and 290 and first axis base plates 260, 280, and 295 for plenty of strength. Central pivot plate 221 twists around a larger two piece axle (second axis pivot 265) with a lip on both ends that is held together by four fasteners. Although there can be as few as zero and as many as several hundred fasteners, four is preferred to provide extra strength to help bear the load of the door assembly and allow adjustable tension between base plate 220 and second axis pivot 265. The two piece second axis pivot 265 also provides the ability to easily remove the door for lubrication and maintenance as well as ease of installation.

First axis pivots 250, 281, and 291, and central axis pivot 265, as shown in FIG. 3, are "T" shaped, such that they have a flush mount lip that extends over the edge of the hole into which they fit. Central axis pivot 265 fits into a central hole in central pivot plate 221, and the top of central axis pivot 265 is wider than the central hole of central pivot plate 221. Thus, when the four fasteners, as shown in FIG. 3, are tightened, central pivot plate 221 is pressed against base plate 220. Similarly, first axis pivots 250, 281, and 291 fit into holes in first axis pivot plates 255, 275, and 290 and first axis base plates 260, 280, and 295. As shown in FIG. 3, the top of first axis base plates 260, 280, and 295 is wider than the holes in the plates. Thus, when first axis pivots 250, 281, and 291 are tightened, first axis pivot plates 255, 275, and 290 and first axis base plates 260, 280, and 295 are held together in a compact and strong manner. The same mechanism or fastener that is used to tighten the pivots also makes taking apart biaxial hinge 150 very easy.

FIG. 3 also shows how motion limiting guide reinforcement 240 is preferably an arched shape. This arched shape allows motion limiting device 245, when moved horizontally out of motion limiting guide 310, to slide along motion limiting guide reinforcement 240 as the door is moved vertically upward. Motion limiting guide reinforcement 240 prevents biaxial vehicle hinge 150 from moving on the first axis (first axis pivots 250, 281, and 291) as the door is moving vertically or resting in a vertical position. Thus, the vehicle door is prevented from closing into the car, and causing damage, at in point in the vertical path except when the door is all the way down and the motion limiting device 245 can slide into motion limiting guide 310.

Figure 4:
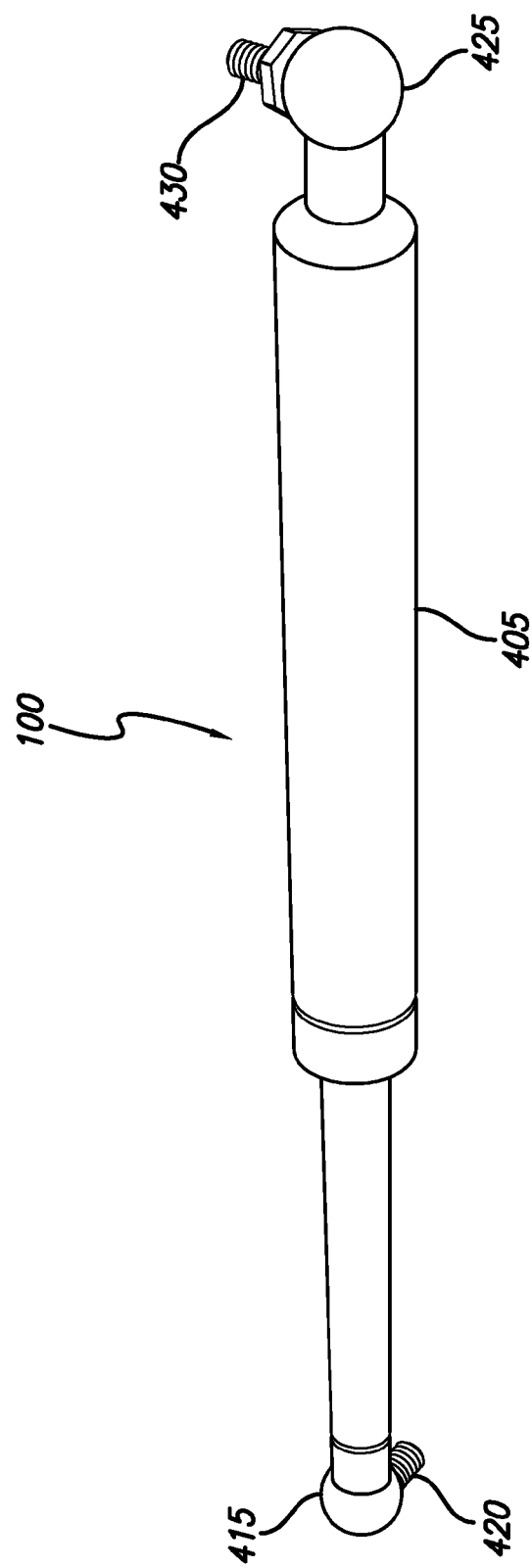
FIG. 4 is an illustration of a side view of one embodiment of the lift support.

FIG. 4 is an illustration of a side view of one embodiment of the lift support. As shown in FIG. 4, lift support 100 preferably is a gas spring that has lift support ball joint ends 415 and 425. Lift support ball joint ends 415 and 425 preferably have connection portions 420 and 430. Connection portions 420 and 430 connect to the biaxial door hinge of the present invention at lift support mount 267 and lift support reinforcement plate 210, and provide help in lifting the vehicle door vertically.

Figure 5:
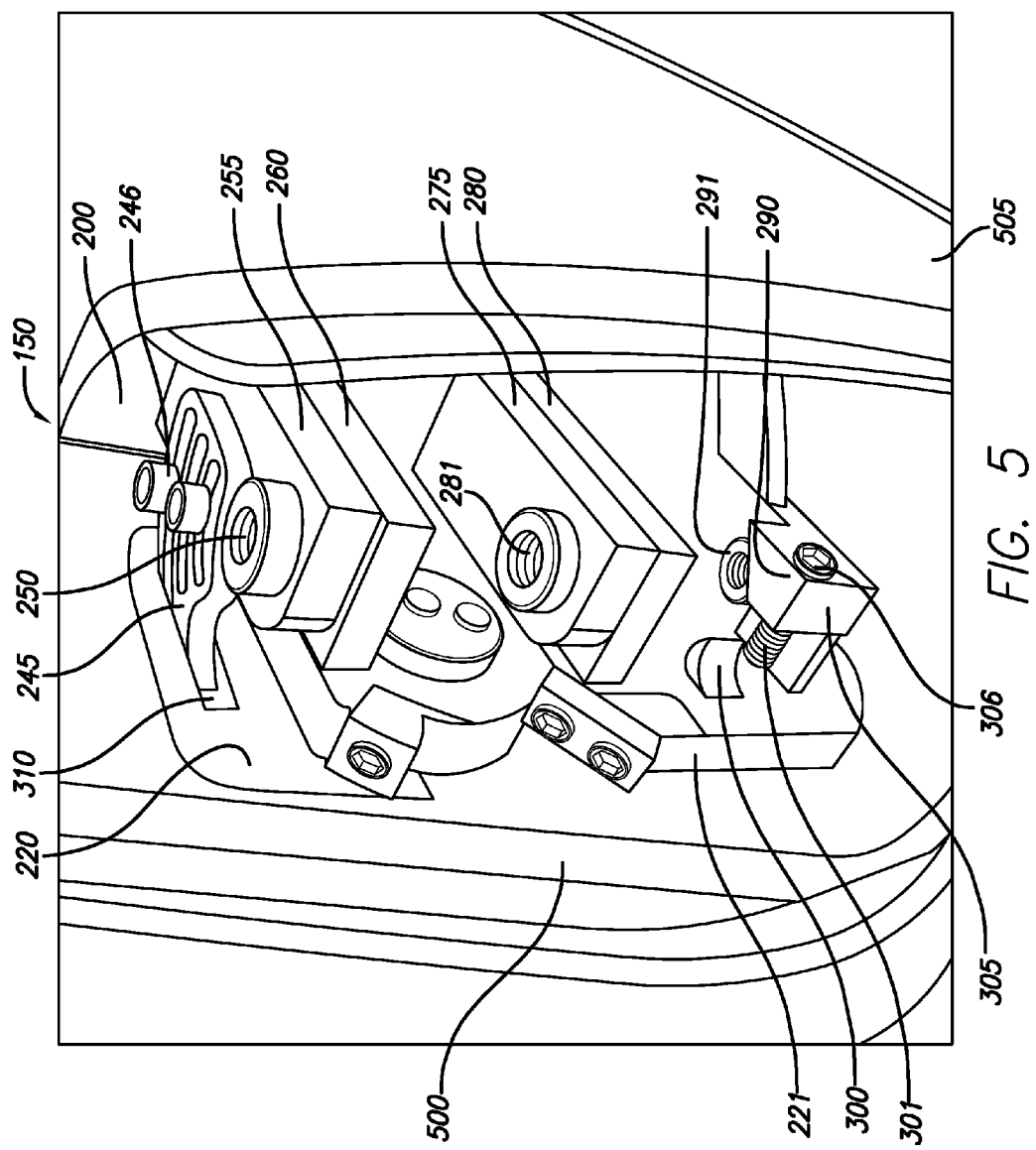
FIG. 5 is an illustration of a front and side perspective view of one embodiment of the vehicle hinge when the vehicle door is closed.

FIG. 5 is an illustration of a front and side perspective view of one embodiment of the vehicle hinge when the vehicle door is closed. As shown in FIG. 5, base plate 220 of biaxial hinge 150 is attached to vehicle B-pillar 500. FIG. 5 also shows that door reinforcement plate 200 is connected to vehicle door 505. Although these connections are preferably via an attachment means, such as welding, they both may be connected by any means, including, but not limited to: nails, screws, friction, straps, zip-ties, chains, clips, binders, bungees, cords, ropes, strings, cables, fasteners, staples, hook and loop, bands, latches, stitches, snaps, wenches, glue, other natural or synthetic chemical adhesives, adhesive tape, heat bonding, chemical bonding, crimps, clamps, or ultrasonic welding. Moreover, although welding is the preferred choice for attaching, connecting, or linking various parts of biaxial hinge 150 to each other, and bolts are the preferred choice for linking parts that move relative to each other, any connection means (for examples see list immediately above) may be used to attach, connect, or link any and all parts of biaxial hinge 150.

As shown in FIG. 5, when the vehicle door is closed, the hinge preferably opens initially in a horizontal direction because motion limiting device 245 is slotted within motion limiting guide 310 and this prevents the hinge from moving on its second, vertical axis. Motion limiting adjuster 246 allows the vehicle owner to set how wide the vehicle door 505 must be opened horizontally before moving the door vertically.

First axis pivots 250, 281, and 291 link first axis pivot plates 255, 275, and 290 (which are preferably permanently attached to door reinforcement plate 200) to first axis base plates 260, 280, and 295 (which are preferably permanently attached to central pivot plate 221). Vehicle door 505 can swing horizontally open to a very wide position, well over 50 degrees, and this horizontal motion is stopped when horizontal stop carrier 305 contacts horizontal stop reinforcement 300. The horizontal movement may be limited by extending horizontal stop adjuster 301 and 306.

Figure 6:
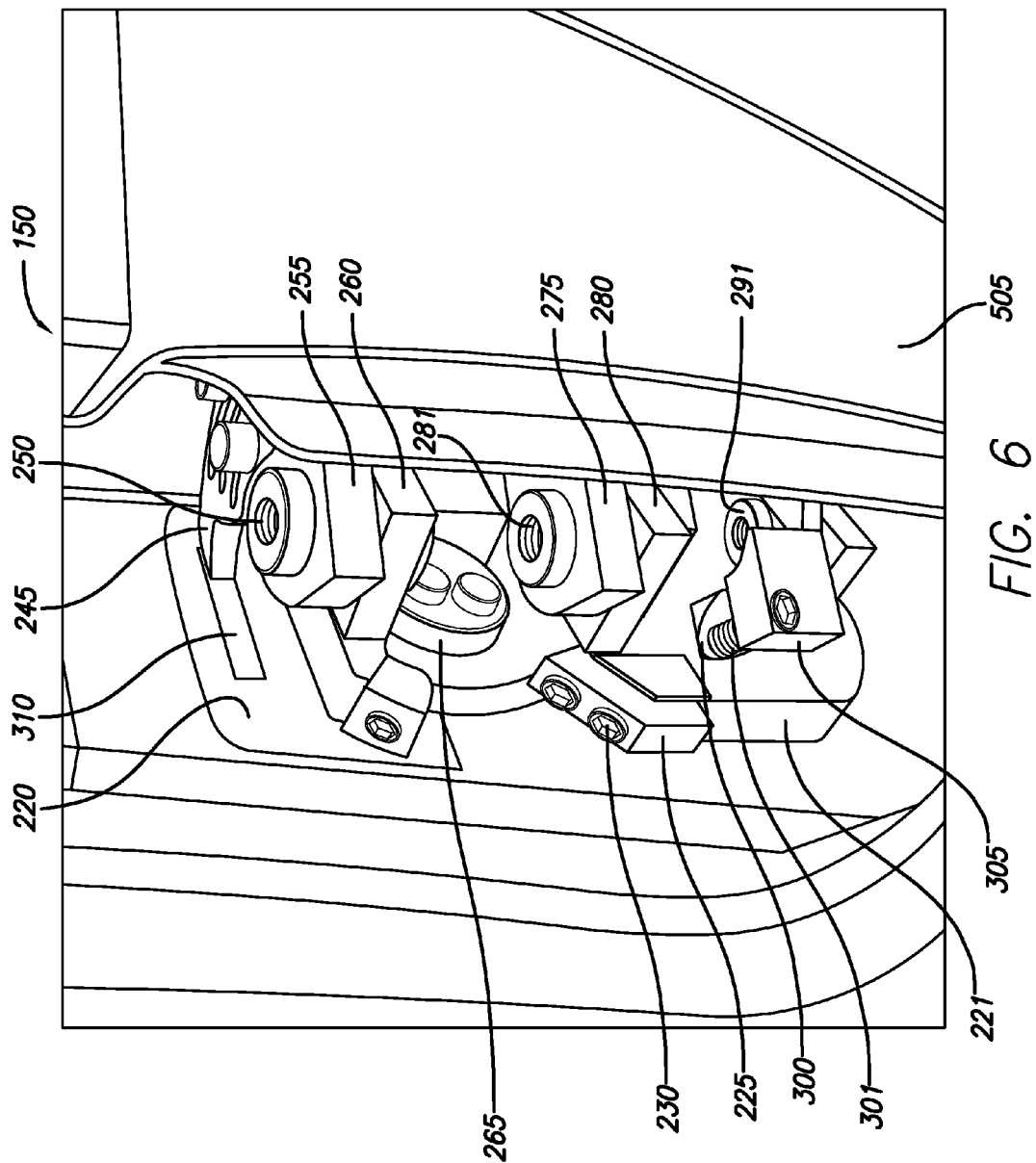
FIG. 6 is an illustration of a perspective view of one embodiment of the vehicle hinge when the vehicle door is partially open horizontally.

FIG. 6 is an illustration of a perspective view of one embodiment of the vehicle hinge when the vehicle door is partially open horizontally. As shown in FIG. 6, vehicle hinge 150 has been opened horizontally. Motion limiting device 245 is free from motion limiting guide 310 and vehicle hinge 150 and vehicle door 505 are no longer prevented from moving vertically (preferably upward). FIG. 6 also shows how horizontal stop adjuster 301 is in contact with horizontal stop reinforcement 300. Thus, vehicle door 505 is prevented from further outward horizontal movement. If there is no horizontal stop adjuster 301, the horizontal movement of vertical hinge 150 stops when horizontal stop carrier 305 contacts horizontal stop reinforcement 300.

FIG. 6 shows how first axis pivot plates 255, 275 (and 290, which is not shown in FIG. 6) have slid horizontally outward relative to first axis base plates 260, 280, (and 295, which is not shown in FIG. 6). This horizontal movement hinges on first axis pivots 250, 281, and 291.

Bottom stop adjuster 230, as shown in FIG. 6, can be adjusted so that vehicle door 505 rests at a precise vertical location when vehicle door 505 is closed. Without bottom stop adjuster 230, the vertical motion of vehicle door 505 is stopped by second axis stop support 225.

As shown in FIG. 6, vehicle door 505 is now ready to be moved vertically upward. To accomplish this movement, central pivot axis plate 221 swings vertically upward around second axis pivot 265. Base plate 220, which is welded to vehicle door 505, remains static during both the horizontal and vertical hinge movements.

Figure 7:
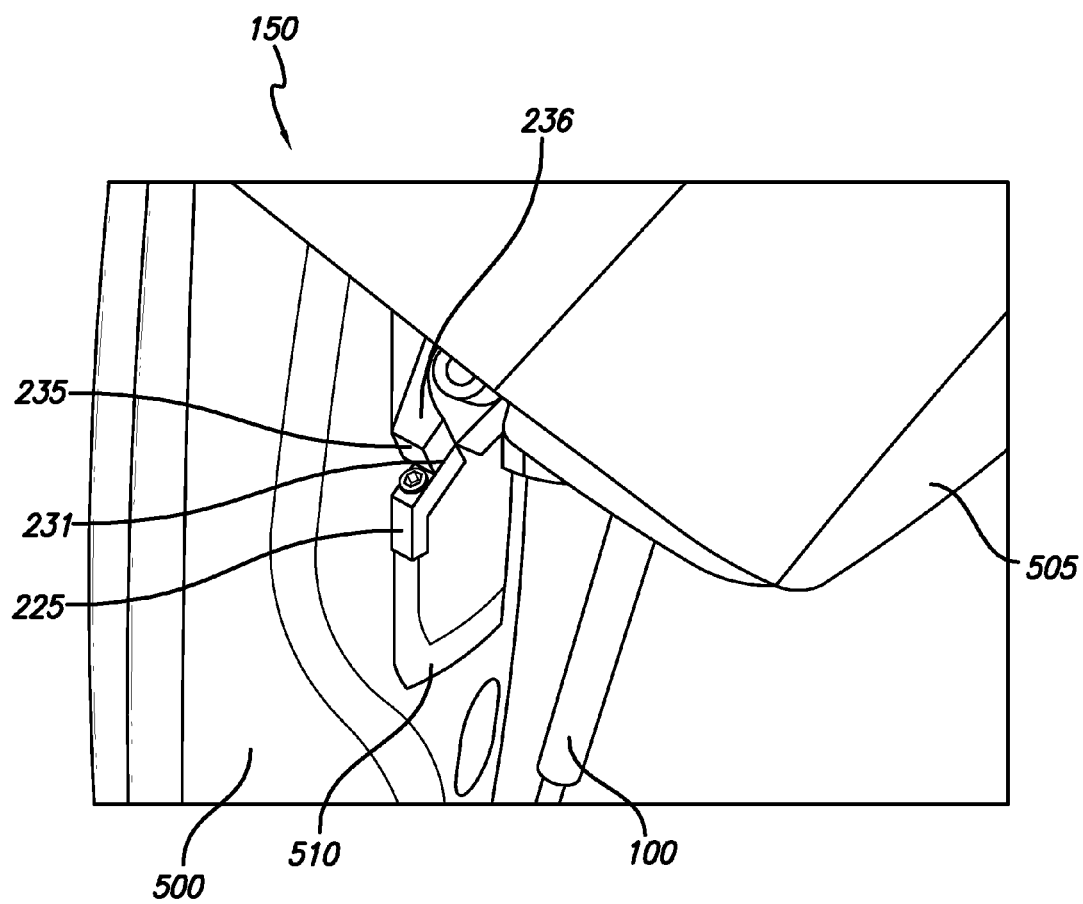
FIG. 7 is an illustration of a perspective view of one embodiment of the vehicle hinge when the vehicle door is open both horizontally and vertically.

FIG. 7 is an illustration of a perspective view of one embodiment of the vehicle hinge when the vehicle door is open both horizontally and vertically. As shown in FIG. 7, vehicle door 505 has moved upward vertically. The upward vertical motion is stopped when incremental top stop 235 contacts top stop adjuster 231. Top stop adjuster 231 is not visible in FIG. 7 because incremental top stop 235 is blocking the view. Top stop adjuster 231 preferably rests within second axis stop support 225 and if top stop adjuster 231 is not present, the upward vertical motion of vehicle door 505 is then stopped by second axis stop support 225. Typically, as shown in FIG. 7, top stop reinforcement 236 contacts incremental top stop 235 when vehicle door 505 is lifted to the peak of its vertical movement.

FIG. 7 also shows how lift support 100 is connected to lift support mount 267 (not shown in FIG. 7), of the biaxial hinge 150, and to lift support reinforcement plate 210 (not shown in FIG. 7), which is welded onto a lower portion of B-pillar 500. Exposed reinforcement plate 510 illustrates what the reinforcement plate after the door is opened vertically.

In summary, the present invention is a biaxial vehicle rear door hinge that opens outward and then upward.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

What is claimed is:

1. A vehicle door hinge, comprising:
 a base plate;
 a door reinforcement plate;
 one or more first axis base plates;
 one or more first axis pivot plates;
 one or more first axis pivots;
 a second axis pivot; and
 a central axis pivot plate;
 wherein said base plate comprises, a second axis pivot holder; and
 wherein said central axis pivot plate comprises, a second axis pivot hole.

2. The vehicle door hinge of claim 1, wherein said vehicle door hinge is attached to at least one rear door of a vehicle.

3. The vehicle door hinge of claim 2, further comprises:
 a motion limiting device;
 wherein said base plate further comprises a motion limiting guide;
 wherein said motion limiting device, when slotted into said motion limiting guide, prevents a vertical movement of said vehicle door hinge; and
 wherein said motion limiting device prevents said vehicle door hinge from closing on a first axis during said vertical movement.

4. The vehicle door hinge of claim 3, wherein said motion limiting device further comprises a motion limiting adjuster; and
 wherein said motion limiting adjuster allows a user to adjust how horizontally wide said vehicle door hinge must open before a vertical movement can be performed.

5. The vehicle door hinge of claim 4, wherein said base plate further comprises a second axis stop support.

6. The vehicle door hinge of claim 5, wherein said central pivot plate further comprises, one or more incremental top stops and a top stop reinforcement.

7. The vehicle door hinge of claim 6, wherein said second axis stop support comprises a top stop adjuster and a bottom stop adjuster.

8. The vehicle door hinge of claim 7, further comprises:
 a horizontal stop carrier; and
 a horizontal stop adjuster;
 wherein said central pivot plate further comprises a horizontal stop reinforcement; and
 wherein said horizontal stop reinforcement stops a horizontal movement of said vehicle door hinge when said horizontal stop carrier or said horizontal stop adjuster contacts said horizontal stop reinforcement.

9. The vehicle door hinge of claim 8, further comprising:
 a lift support.

10. The vehicle door hinge of claim 9, further comprising:
 a lift support reinforcement plate;
 wherein said central pivot plate further comprises, a lift support mount.

11. The vehicle door hinge of claim 10, wherein said lift support attaches to said lift support reinforcement plate and said lift support mount;
 wherein said lift support provides additional support for opening and closing a vehicle door.

12. The vehicle door hinge of claim 11, wherein said second axis pivot allows said vehicle door to open vertically at least until a side of said vehicle door is perpendicular to a ground.

13. The vehicle door hinge of claim 12, wherein said one or more first axis pivots allow said vehicle door to open horizontally at least 60 degrees.

* * * * *